United States Patent [19]
Hobbs et al.

[11] 3,907,007
[45] Sept. 23, 1975

[54] APPARATUS AND METHOD FOR FORMING WIRES ON A WIRE-RECEIVING MEMBER

[75] Inventors: Billy H. Hobbs, Dallas; Gary P. Krahmer, Mesquite; Virgil W. Wood, Rockwall, all of Tex.

[73] Assignee: Western Electric Company, Incorporated, New York, N.Y.

[22] Filed: Jan. 23, 1974

[21] Appl. No.: 436,017

[52] U.S. Cl. ........................ 140/93 R; 29/203 MW
[51] Int. Cl.² ...................................... B21F 27/00
[58] Field of Search .......... 140/92.1, 93; 29/200 A, 29/203 B, 203 MW, 241; 317/122; 214/1, 1.1; 226/92, 110; 254/134.3, 134.5

[56] References Cited
UNITED STATES PATENTS

| | | | |
|---|---|---|---|
| 2,987,804 | 6/1961 | Nichol | 29/203 |
| 3,019,915 | 2/1962 | Long | 214/1.1 |
| 3,295,562 | 1/1967 | Concannon | 140/93 |
| 3,353,791 | 11/1967 | Warshawsky | 254/134.3 |
| 3,693,228 | 9/1972 | Logan | 29/203 |
| 3,699,630 | 10/1972 | Tarbox et al. | 29/203 |
| 3,769,699 | 11/1973 | Bennett et al. | 140/93 |

Primary Examiner—Lowell A. Larson
Attorney, Agent, or Firm—D. D. Bosben

[57] ABSTRACT

Apparatus for automatically forming wires on a wire-receiving member, such as in the manufacture of harness-type cable, includes a bank of wiring heads, one for each wire or set of wires, and through which the wires extend from respective tensioning devices and supply reels. The wiring heads are releasably mounted on respective seats and a wire positioning device is mounted for movement in X, Y and Z directions. At the start of a cable forming operation, end portions of the wires which extend through the wiring heads are anchored against movement. The wire positioning device, under the direction of a controller, then attaches itself to a selected one of the wiring heads, removes the wiring head from its seat, lays out wire through the wiring head on a cable forming board, including the securing of the wire to an anchor member on the cable forming board at the beginning and completion of the run, returns the wiring head to its seat, and detaches itself from the wiring head. This sequence of operations is repeated by the wire positioning device with the other wiring heads and their associated wires, selectively, until the layout of the cable has been completed.

25 Claims, 8 Drawing Figures

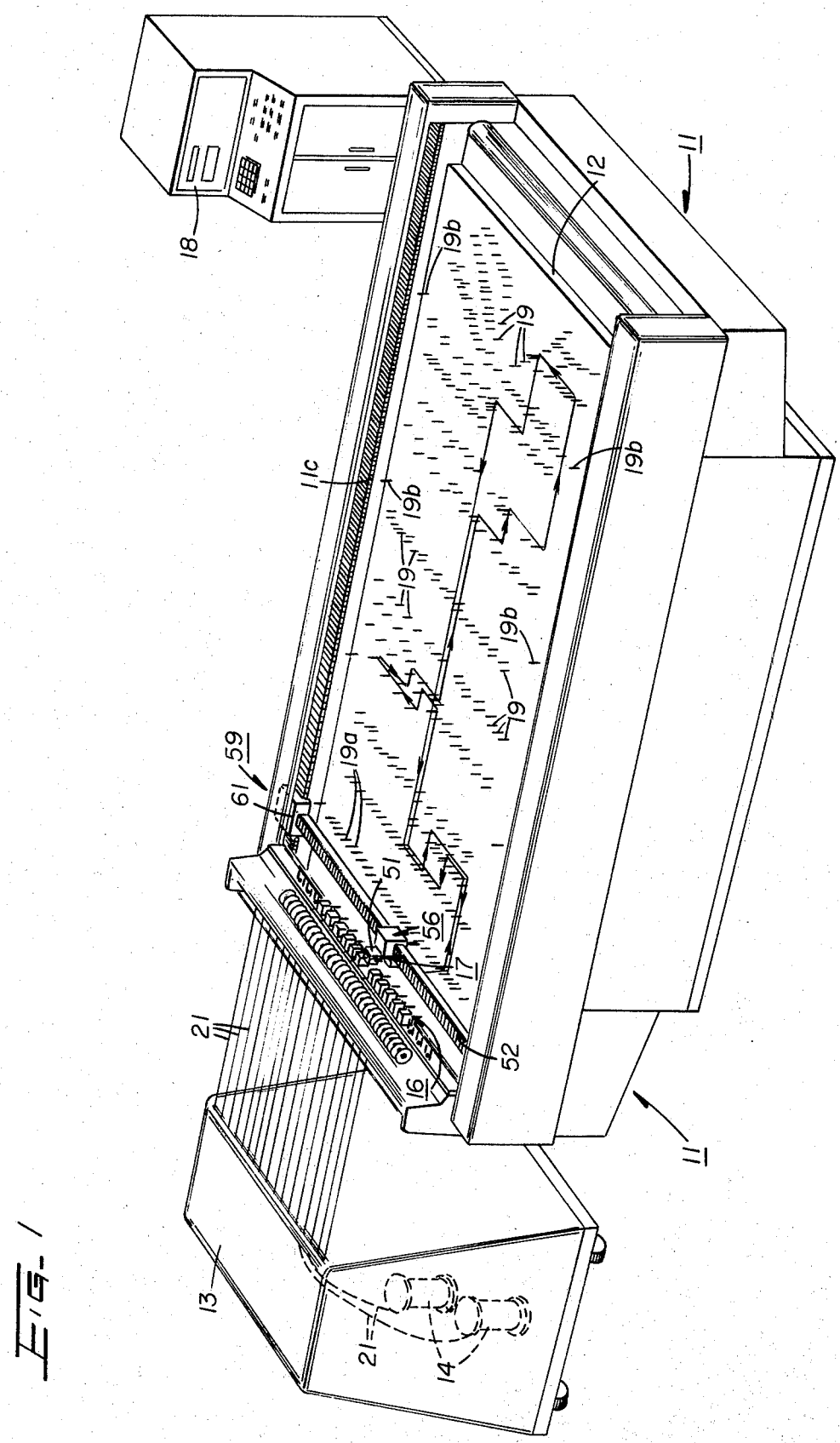

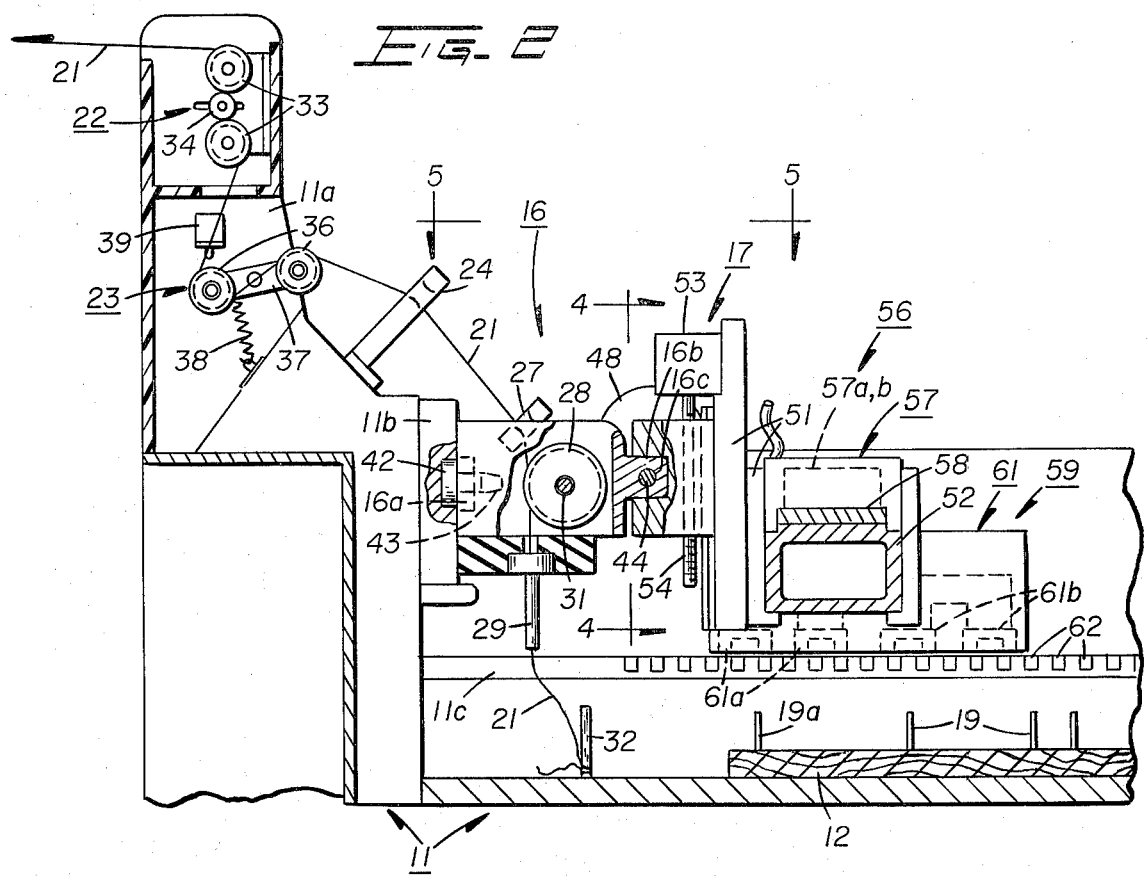
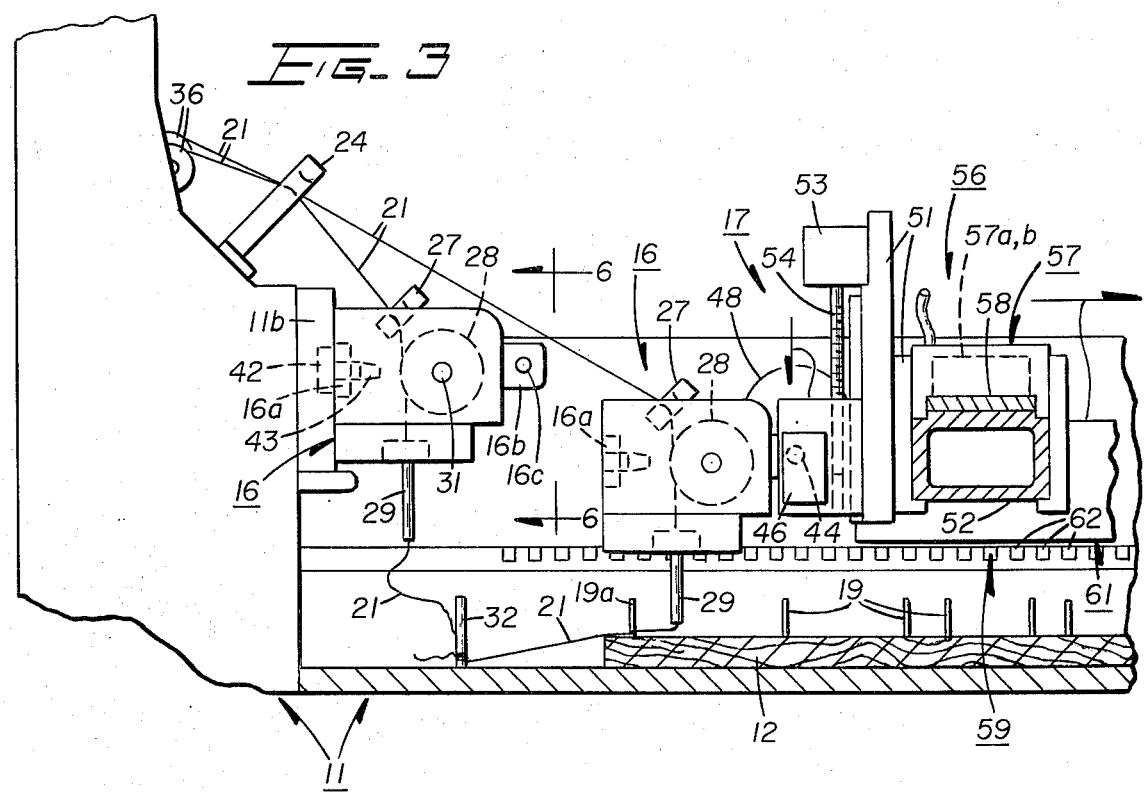

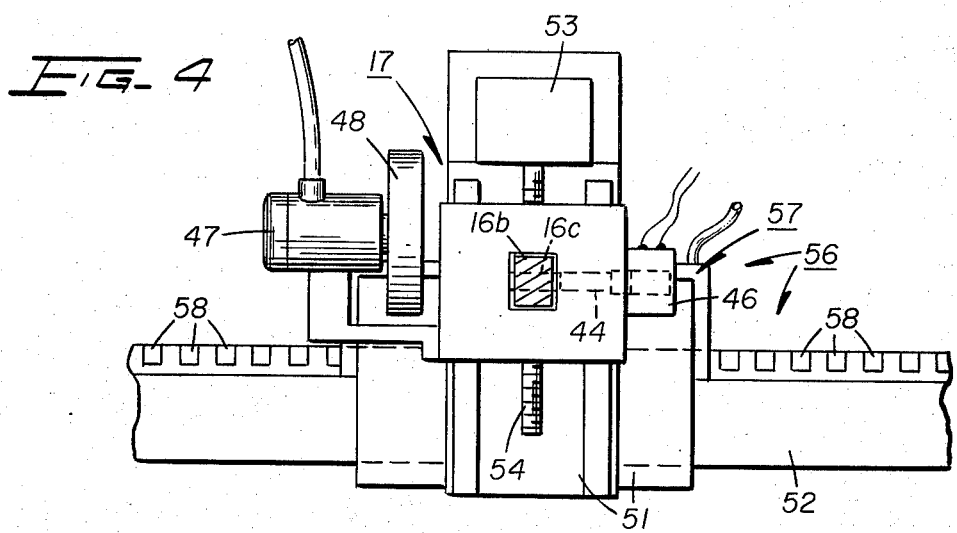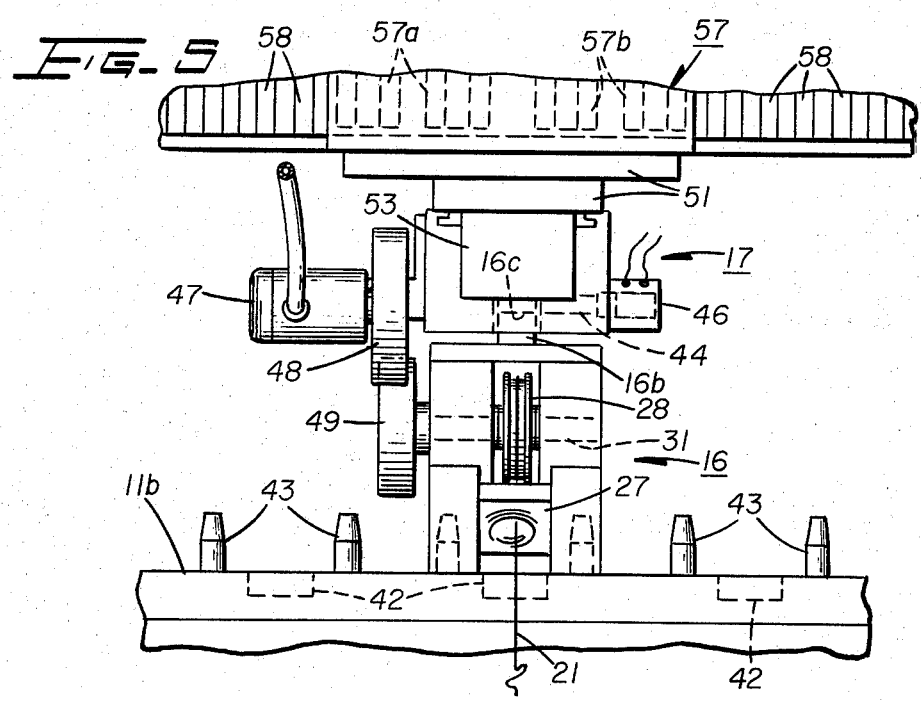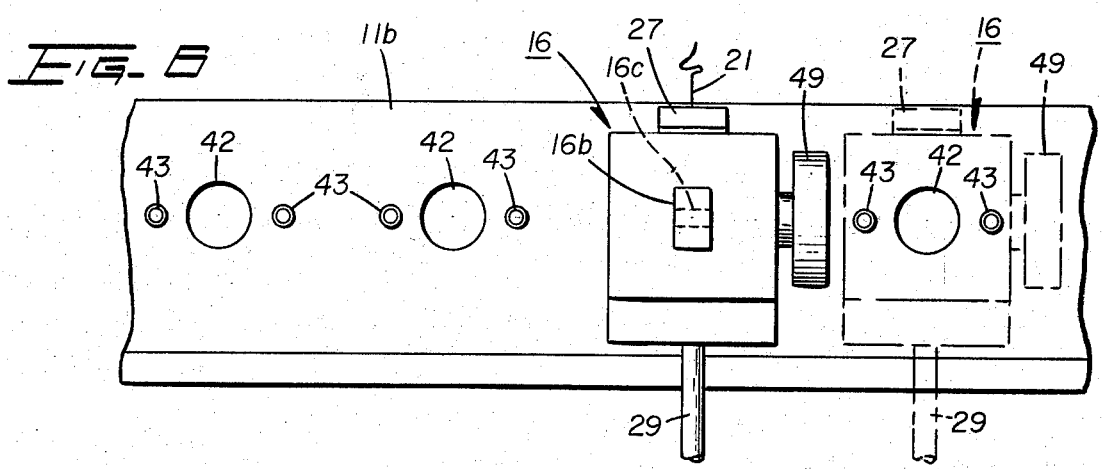

3,907,007

APPARATUS AND METHOD FOR FORMING WIRES ON A WIRE-RECEIVING MEMBER

BACKGROUND OF THE INVENTION

1. Field of the Invention

This invention relates to an apparatus and method for forming wires on a wire-receiving member, and more particularly to an apparatus and method for selectively and sequentially moving wiring heads to lay out wires or sets of wires for a harness-type cable on a cable forming board.

2. Description of the Prior Art

At the present time, cable harnesses normally are manually laid out on nail boards from wire supplies in accordance with written instructions set forth on wiring lists. More specifically, a flat board of wood or other nail supporting material has an array of nails or pegs set in a pattern corresponding to the wiring outline of the cable harness to be formed. The cable former, following his written instructions, selects a wire (or plurality of wires) from the wire supplies, attaches one end of the wire to a designated anchor nail, passes the wire about a loop nail and a breakout nail, and then routes the wire along designated paths to additional designated nails in sequence, pulling the wire from its wire supply as necessary, and finally terminating the wire on a second anchor nail, or back on the initial anchor nail. The routing of each wire (or plurality of wires) in this manner is referred to as a "wire run." The cable former then continues laying out the cable, either utilizing the same wire without cutting it, or cutting the wire and selecting a new wire, as indicated by his written instructions. After the layout of the cable is complete, the wires are bound, cut and selectively stripped of insulation to form the finished cable.

The above-described system of laying out the cable generally is disadvantageous, particularly where relatively large complex cables are involved, for a number of reasons. For example, frequently cables must be formed on relatively large boards having dimensions on the order of 6 × 10 feet and having several hundred wiring nails or points thereon. Further, a large number of different wires may be involved in a particular cable. As a result, the forming of the cable is relatively slow and time consuming and it is difficult for the cable former to follow the instructions on the wiring lists properly, whereby the completed cable often contains errors which must be corrected before the cable can be used in the equipment for which it is intended.

As a result, various visual and audio systems have been proposed for assisting the cable former in the cable forming operation. By way of illustration, the wiring list information may be displayed on a television screen, and/or oral instructions may be given to the cable former through a speaker or earphones. Another example of a system of this type is shown in the U.S. Pat. No. 3,163,926 issued Jan. 5, 1965 to E. W. Gray, in which indicating lamps adjacent the wiring nails or pegs are selectively operated to indicate to the cable former the route which a particular wire run is to follow.

Various automatic cable forming machines also have been proposed, such as that disclosed in the U.S. Pat. No. 3,340,904, issued Sept. 12, 1967 to L. S. Gage et al. In this patent, wires extend from respective wire supplies through a wire guide on a wire positioning mechanism and initially are anchored to an upstanding member on the cable forming board. The wire positioning mechanism and the cable forming board then are moved relative to one another in an X-Y coordinate system under the direction of a punched tape controller, to form wires about additional upstanding wire receiving members on the cable forming board on opposite sides of its centerline. After the wires have been laid out on the board, they are bound and then cut along the centerline of the board to produce two cables of like or dissimilar configuration as desired. The variety and complexity of the cables which can be conveniently formed with this apparatus, however, is somewhat limited because the apparatus is not capable of automatically selecting any one of the relatively large number of wires and forming the wires into a cable in different desired sequences.

The U.S. Pat. No. 3,693,228, issued Sept. 26, 1972 to D. J. Logan, and the U.S. Pat. No. 3,699,630, issued Oct. 24, 1972 to J. W. Tarbox et al, also show apparatus for the automated forming of harness-type cable on a cable forming board. In the Logan et al and Tarbox et al apparatus, however, the wire supplies are mounted on a traversing carriage movable relative to the cable forming board, which arrangement is undesirable, particularly where a large number of supply reels are involved, because of the combined size and weight of the carriage, the supply reels and other associated apparatus, such as wire guiding, feeding and cutting mechanisms which also are mounted on the traversing carriage, thus precluding the forming of complex cables at high speed.

Similarly, Hitachi Cable Ltd. has recently disclosed apparatus in which a pickup device selectively attaches itself to wire supply reel magazines and moves each reel magazine about over a cable forming board in a cable forming operation. As in the case of the apparatus in the Gage et al, Logan and Tarbox et al patents, however, a primary object of the subject invention is to provide an improved system capable of accurately forming relatively complex cable harnesses at high speed.

SUMMARY OF THE INVENTION

In general, in accordance with this invention the forming of wires on a wire-receiving member or wiring frame involves anchoring the ends of a plurality of wires which extend from respective wire supplies through and beyond respective wiring guides, against movement. In a wiring operation, one of the wiring guides is removed from a respective seat and then moved over the wire-receiving member relative to its respective wire supply in a desired path to lay the wire emanating from the wiring guide between and about preselected wire locating members on the wire-receiving member in a predetermined pattern. After the wiring operation has been completed, the wiring guide is returned to its seat and additional wiring operations are accomplished in the same manner with the other wiring guides. The sequential movement of the wiring guides over the wire-receiving member may be accomplished automatically by a wire positioning device which is selectively attached to and detached from each of the wiring guides at the beginning and completion of its associated wiring operation, respectively.

BRIEF DESCRIPTION OF THE DRAWINGS

FIG. 1 is an isometric view of a cable forming apparatus in accordance with the invention;

FIG. 2 is an elevational view of a portion of the apparatus in FIG. 1, partially in cross-section and illustrating one phase of the operation of the apparatus;

FIG. 3 is an elevational view similar to FIG. 2 and showing the apparatus in a wire laying phase of its operation;

FIG. 4 is an elevational view of the apparatus as viewed along the line 4—4 in FIG. 2;

FIG. 5 is a plan view of a portion of the apparatus as viewed along the line 5—5 in FIG. 2;

FIG. 6 is an elevational view of the apparatus taken along the line 6—6 in FIG. 3;

DETAILED DESCRIPTION

Figure 7:
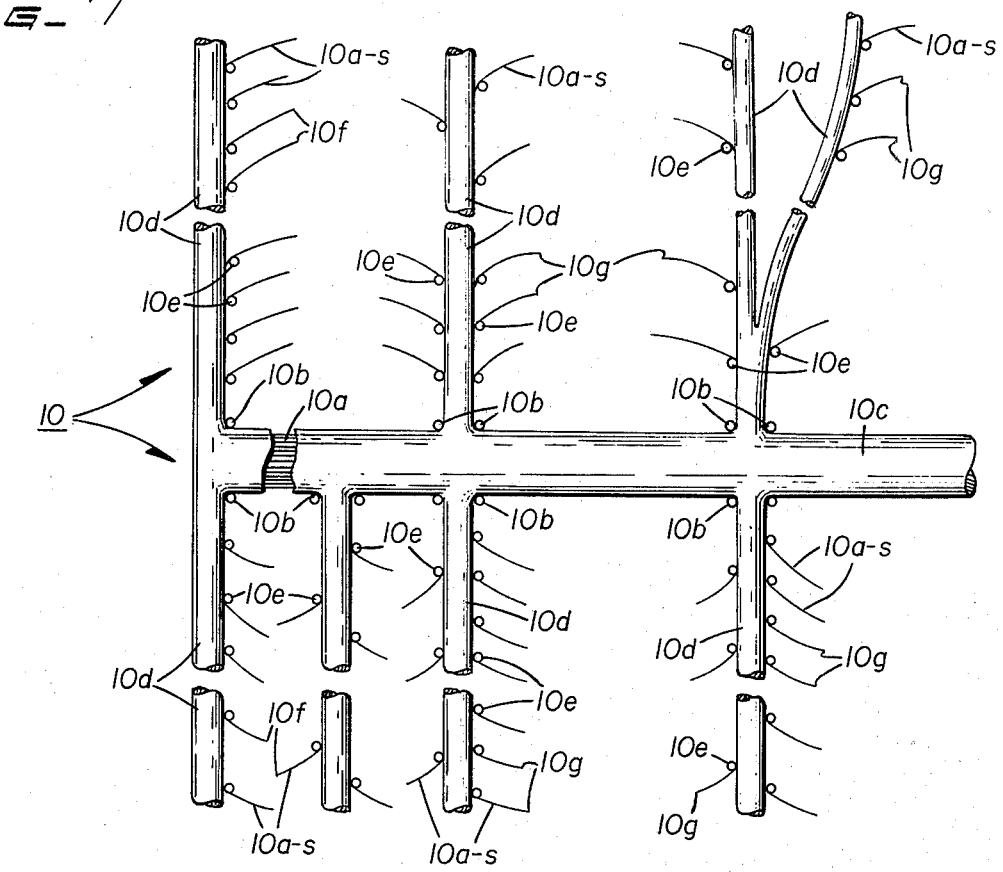
FIG. 7 is a schematic representation of a cable harness which may be formed with the apparatus of the invention.

Referring to FIG. 7, the disclosed embodiment of the invention relates to the forming of a harness-type cable 10 made up of a plurality of electrically conducting wires 10a of various types and gages, and having insulating jackets of different colors and/or markings. At various points 10b along a trunk or main branch 10c of the cable 10, certain of the insulated wires 10a extend from the trunk to form arms or subbranches 10d of the trunk. At various "breakout" points 10d along the arms or sub-branches 10d, where the wires 10a are to be connected to apparatus terminals, the wires extend laterally from the arms and are provided with insulation stripped end portions 10a-s in a well known manner. Certain of the wires 10a in the cable 10 may have at least one stripped end portion 10a-s terminating at a point 10f in one of the endmost arms 10d at the left-hand end of the trunk 10c, as viewed in FIG. 7, while other of the wires 10a may extend only between respective terminating points 10g within the cable, depending on the cable involved.

Referring to FIGS. 1–6, which illustrate apparatus in accordance with this invention, it is seen that the apparatus includes a support table 11 upon which a planar cable forming board (or wiring frame) 12 is removably positioned and clamped, a wire dispensing cart 13 having a plurality of wire supply reels 14 mounted thereon, a bank of wiring heads or guides 16 located adjacent one end of the support table and separately movable over the cable forming board relative to and independently to each other and the wire supply reels, a wire positioning device or drive head 17 mounted on the support table for movement in X, Y and Z directions independently of the wire supply reels and the wiring heads, and a punched tape controller 18. The cable forming board 12 is provided with a plurality of upwardly projecting wiring pins 19 located at selected coordinate points of an X–Y coordinate system so as to define wiring points comparable to the sub-branch points 10b and the "breakout" points 10e for the insulated wires 10a of the cable 10, as indicated in FIG. 7, and at other coordinate wiring points as necessary, in order that the cable can be properly formed thereon. The punched tape controller 18 may be of any suitable type capable of converting input data information on a punched magnetic tape to electrical signals for directing the operation of the apparatus in a manner to be described.

A plurality of wires 21 on the supply reels 14 on the wire dispensing cart 13 pay off vertically over the ends of the reels through suitable flyers (not shown) in a well known manner, and over suitable guide pulleys (not shown) on the cart. Referring to FIG. 2, in the disclosed embodiment of the invention, each wire 21 then passes through a back-tensioning mechanism 22, a wire tension sensing mechanism 23, and an eyelet-type guide 24 fixedly mounted on an upstanding frame portion of the support table 11. From the eyelet-type guide 24 the wire 21 travels downward through a second fixed eyelet-type guide 27 mounted on a respective one of the wiring heads 16. The wire 21 then makes one or two turns about a rotatable feed capstan 28, and passes downward through a feed or guide tube 29. The feed capstan 28 is fixedly secured to a rotatable shaft 31, and is disposed in an opening in the wiring head 16, with the shaft being journalled for rotation in side walls thereof. The feed tube 19 may be fixedly mounted on the wiring head 16, or may be resiliently mounted on the the wiring head in a suitable manner to reduce the possibility of damage if it should strike one of the upstanding wiring pins 19 on the cable forming board 12. The end portion of the wire 21 projecting from the feed tube 29 below the wiring head 16 is anchored against movement in a suitable manner, such as by being hand-wrapped about a respective one of a plurality of upstanding pins 32 mounted on a bed of the support table 11.

Each of the wire back-tensioning mechanisms 22 may be of any suitable type and in the illustrated embodiment of the invention includes a pair of vertically spaced rollers 33 rotatably mounted on a respective vertically extending frame plate 11a of the support table, with an intermediate roller 34 being adjustably mounted on the frame plate for horizontal movement between the spaced rollers. Thus, by adjusting the position of the intermediate roller 34 between the spaced rollers 33, the amount of back-tension or drag on their respective wire 21, at the exit end of its feed tube 29, can be varied as desired.

Each wire tension sensing mechanism 23 also may be of a suitable type and in the illustrated embodiment of the invention includes a rocker assembly in the form of a pair of pulleys 36 mounted adjacent opposite ends of a rocker arm 37 which is centrally pivoted on its respective vertical frame plate 11a, and which is urged counterclockwise in FIG. 2 by a coil spring 38. Also mounted on the vertical frame plate 11a in association with the rocker assembly 36, 37 is a limit switch 39 which is engagable by the rocker arm 37 in the event of excessive back-tension in the respective wire 21 and which is suitably connected into the control circuitry for the apparatus so as to be capable of interrupting the operation of the apparatus.

In a cable forming operation, the wire positioning device 17, under the direction of the controller 18, initially moves to a position adjacent the bank of wiring heads 16 and attaches itself to a selected one of the wiring heads. The wire positioning device 17 then removes this wiring head 16 from a parking bar in the form of a fixed frame member 11b of the support table 11, and routes the wiring head over the cable forming board 12 to lay out the associated wire 21 continuously through the wiring head onto the board, as illustrated in FIG. 1, under the direction of the controller 18, which directs the wire positioning device through X, Y and Z movements as required. In this connection, initially the wire positioning device 17 routes the wiring head 16 to a preselected one of a plurality of "start" anchor pins 19a arranged in a row on the cable forming board 12 adjacent its left-hand side, as viewed in FIGS. 1, 2 and 3, and automatically wraps the wire 21 about the anchor pin, the particular anchor pin which is utilized being dependent upon the point at which the laying of the wire 21 on the cable forming board is to begin. When the laying of the wire 21 has been completed, the wire positioning device 17 again causes the wire to be wrapped about the initial "start" anchor pin 19a, returns the wiring head 16 to the fixed parking bar 11b, and detaches itself from the wiring head. Further, in instances where one of the wire runs terminates at an intermediate point of the cable forming board 12, the wire positioning device 17 is directed to one of several anchor pins 19 (FIG. 1) located adjacent opposite sides of the board, where it wraps the wire 21 about this anchor pin, and then proceeds along the outer periphery of the board and back to the initial "start" anchor pin 19a.

This sequence of operations is repeated by the wire positioning device 17 with the wiring heads 16 and their associated wires 21, selectively, until a layout of the cable 10 being formed has been completed. The wires 21 then are cut between the anchor pins 19a on the cable forming board 12 and the anchor pins 32 on the bed of the support table 11, and between the anchor pins 19a and the guide tubes 29, whereupon the board may be removed from the support table 11 and replaced with another cable forming board, with the wires being maintained in their desired positions on the first board as a result of their having been wrapped about the anchor pins 19a and 19b on the board. The wires 21 on the first cable forming board 12 then are bound in a suitable manner, and are cut and stripped as necessary to form the individual wires 10a having the stripped connector end portions 10a–s, as illustrated in FIG. 7, to complete the formation of the cable 10.

FIGS. 2–6 illustrate one manner in which the wiring head 16 can be removably mounted on the fixed parking bar 11b and in which each wiring head may be removed from the parking bar, and replaced thereon, by the wire positioning device 17. The fixed parking bar 11b is provided with a row of horizontally spaced permanent magnets 42 fixedly mounted in suitable pockets therein, with one magnet being provided for each of the wiring heads 16, for retaining the wiring head on the parking bar. For this purpose, the body of the wiring head 16 may either be formed of ferromagnetic material, or may have a ferromagnetic member 16a mounted thereon, so that the wiring head will be attracted to the associated magnet 42 on the parking bar. On opposite sides of each of the magnets 42 on the parking bar 11b, a pair of forwardly projecting tapered support pins or dowels 43 also are secured to the parking bar and are receivable in corresponding recesses in the body of the wiring head 16, each of the magnets and its associated pair of support pins thus defining a seat for the wiring head on the parking bar 11b.

To attach one of the wiring heads 16 to the wire positioning device 17, each wiring head includes a forwardly projecting lug 16b which is receivable in a correspondingly shaped seat in the wire positioning device 17. The wire positioning device 17 also includes a horizontally movable locking pin 44 connected to a selectively operable actuating device 46, such as an electrical solenoid or an air cylinder, in which latter instance the pin may be a piston rod of the air cylinder. When the wire positioning device 17 is moved into its pickup position with respect to the wiring head 16, the actuating device 46 is energized to move the locking pin 44 into an advanced position as shown in FIGS. 4 and 5, in which it is received in an aperture 16c in the lug 16b of the wiring head, to secure the wiring head to the wire positioning device for movement therewith as an integral unit in a wire run. When the wire positioning device 17 subsequently returns the wiring head 16 to its seat 42, 43 on the parking bar 11b, the actuating device 46 is deenergized to withdraw the locking pin 44 from the lug aperture 16c and the wire positioning device can be removed from the wiring head, which then is retained in position on its support dowels 43 by the adjacent magnet 42.

Referring to FIG. 3, after one of the wiring heads 16 has become secured to the wire positioning device 17 by the locking pin 44, the wire positioning device is moved horizontally from the parking bar 11b and the positive attachment of the wiring head to the wire positioning device overcomes the force of the permanent magnet 42 on the parking bar to pull the wiring head therefrom. The wire positioning device 17 then is moved downward to move the wiring head 16 into a wire laying position closely adjacent the cable forming board 12 and to wrap the respective wire 21 on the associated anchor pin 19a, after which the wire positioning device is routed over the cable forming board under the direction of the controller 18, to lay the wire 21 emanating from the guide tube 29 of the wiring head about selected ones of the wiring pins 19, and thus through the wiring points defined thereby, in a preselected pattern, as above-described and as illustrated in FIG. 1.

During a wire laying operation, the capstan 28 on each wiring head 16 functions to provide a positive feed of its wire 21 on demand, in response to tightening of the wire about the capstan as the tension in the wire increases above a preselected amount. In this regard, the back-tensioning mechanism 22 for the wire 21 is adjusted so that at the beginning of a wire run the tension of the wire as it exits from the guide tube 29 of the wiring head 16 is a preselected amount, such as two pounds. Then, when the tension in the wire 21 increases above this amount the wire becomes more tightly wrapped about the feed capstan 28, which is being continuously driven during the wire laying operation, and the capstan causes a positive feed of the wire downward through the feed tube as necessary. In the illustrated embodiment of the invention, each feed capstan 28 is continuously driven by a small air motor 47 when the wire positioning device moves into its pickup position with respect to the wiring head 16 as above described, the air motor being mounted on the wire positioning device 17 by a suitable bracket and being provided with a drive wheel or gear 48 (FIG. 5) which is drivingly engagable with a wheel or gear 49 secured to an extension of the shaft 31 upon which the capstan is mounted, for this purpose. The air motor 47 may be continuously driven, or may be controlled in a suitable manner so as to be driven only when one of the wiring heads 16 is attached to the wire positioning device 17, as desired.

The movement of the wire positioning device 17 in X, Y and Z directions with respect to the cable forming board 12 may be accomplished in any suitable manner. For example, in the illustrated embodiment of the invention, the wire positioning device 17 is mounted for vertical movement in a Z direction on a carriage 51 which is movable horizontally in a Y direction on an elongated beam 52 extending transversely above the top of the support table 11. The beam 52, in turn, is mounted for horizontal movement in an X direction adjacent the opposite sides of the support table 11.

More specifically, in the illustrated embodiment of the invention, vertical movement of the wire positioning device 17 is accomplished by a pulse-type electrical motor 53 mounted on the carriage 51 and having its output shaft drivingly connected to the wire positioning device by a suitable screw-threaded drive 54. The carriage 51 is movable along the beam 52 by a suitable traversing mechanism 56 which, for high speed operation and reduced maintenance, preferably is a linear reluctance motor system of the type disclosed in the U.S. Pat. No. 3,457,482 to B. A. Sawyer. Thus, in the disclosed embodiment of the invention, an air-flotation type motor 57 includes first-phase and second-phase sets of electromagnetic heads 57a and 57b positioned over a series of spaced bars 58 of magnetic material embedded in the top of the beam 52, which is constructed of a suitable nonmagnetic material, such as aluminum. The relative positions of the magnetic bars 58 and the poles of the electromagnetic heads 57a and 57b are such that by alternately energizing the first and second phase sets of the electromagnetic heads with the proper polarity to change the related magnetic fields between the poles and the magnetic bars, the electromagnetic heads cause the motor 57, and thus the carriage 51 secured thereto, to move linearly along the beam 52. The beam 52 may be moved over the support table 11 in a similar manner by a traversing mechanism 59 which includes a synchronized pair of linear reluctance motors 61 (only one shown) secured to the opposite ends of the beam and each having electromagnetic heads 61a and 61b cooperable with a row of spaced bars 62 of magnetic material embedded in the top of a nonmagnetic member 11c of the support table 11 along each side thereof. In the alternative, the traversing mechanisms 56 and 59 may be of any other known type, as desired. By way of illustration, the traversing mechanism 56 may include an electrical or hydraulic motor having a gear on its output shaft drivingly engaged with a cooperating gear rack on the top of the beam 52.

Figure 8:
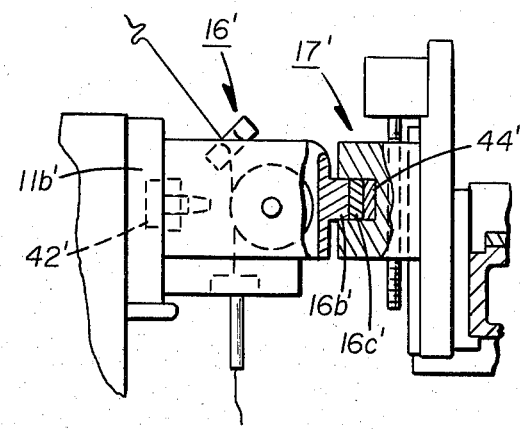
FIG. 8 is a partial elevational view of an alternative embodiment of the invention.

FIG. 8 illustrates an alternate embodiment of the invention which is substantially identical to the embodiment of the invention shown in FIGS. 1–6, except that a wire positioning device 17' is releasably attachable to the plurality of wiring head 16' by a selectively operable electromagnet 44'. In this embodiment of the invention, a nose portion 16b' of each wiring head 16' includes a nonpermanent ferromagnetic member 16c'. Thus, when the nose 16b' of the wiring head 16' is received in a seat in the wire positioning device 17', the electromagnet 44' is energized to attract the ferromagnetic member 16c'. Then, when the wire positioning device 17' is moved to the right in FIG. 8, the electromagnet 44', which is substantially stronger than a retaining permanent magnet 42' on a parking bar 11b', overcomes the force of the magnet to remove the wiring head from the parking bar. The wire positioning device 17', with the wiring head 16' attached thereto, then is utilized to lay out a wire 21' as above described.

It is also within the purview of the invention to replace the wire positioning device or drive head 17 on the carriage 51 with a suitable air-driven or electrical drill device (not shown). The apparatus then may be used in the initial preparation of the cable forming board 12, to drill holes in the board at desired locations for the reception of the wiring pins 19 and the anchor pins 19a and 19b, under the direction of the controller 18. Further, the wiring pins 19 on the cable forming board 12 may be arranged so that the layout of more than one cable can be accomplished on the board at a time, if so desired.

SUMMARY

Apparatus has been disclosed for automatically selecting any one of the relatively large number of different wires 21 and laying the wires on the cable forming board 12, in different desired sequences, in a rapid, accurate and efficient manner. More specifically, in the illustrated embodiment of the invention this is accomplished by locating the wire supply reels 14 in positions spaced from the support table 11, and then extending the wires 21 from the wire supplies through the releasably mounted wiring heads or guides 16 and securing the ends of the wires to the anchor pins 32, whereby each of the wiring heads can be selectively removed form the parking bar 11b for a wiring operation, and returned to its "home" position on the parking bar when the wire run is completed, by the wire positioning device 17. This arrangement also eliminates the need for apparatus to cut the wires during the layout of the cable 10, at the completion of each wire run, before the next wire run can be started. As a net result, the only mechanism which must be traversed over the cable forming board 12 during each wire run by the carriage 51 and the beam 52 is the wire positioning device 17 and the particular wiring head 16 attached thereto. Accordingly, the size of the tranversing mechanisms 56 and 59 required, including the motors 57 and 61, can be relatively small and of light construction in comparison to prior known apparatus, whereby the layout of each wire 21 can be accomplished at relatively high speed and with a high degree of accuracy. The securing of the wires 21 to the anchor pins 19a on the cable forming board 12 at the beginning and completion of each wire run also provides an arrangement in which the wires 21 readily can be cut adjacent these anchor pins when the lay out of the cable 10 has been completed, so that the board and the cable can be removed for additional processing of the cable without the cut wires becoming dislocated on the board.

What is claimed is:

1. Apparatus for forming wires in sequence on a wire-receiving member having an array of wiring points defined thereon, utilizing wires mounted on a plurality of respective wire supplies, which comprises: a a plurality of wiring guides releasably mounted on respective seats and each capable of having at least one wire fed therethrough from a respective one of the wires supplies as said wiring guide is moved through the wiring points on the wire-receiving member in a wire forming operation, said wiring guides being separately movable through the wiring points on the wire-receiving member relative to and independently of each other and the wire supplies;

a wire positioning device movable relative to the wire-receiving member independently of the wire supplies and said wiring guides;

means for releasably attaching a preselected one of said wiring guides to said wire positioning device when said wire positioning device is moved adjacent said wiring guide; and means for moving said wire positioning device adjacent a preselected one of said wiring guides to attach said wire positioning device to said preselected wiring guide, for then moving said wire positioning device and said attached wiring guide through preselected ones of the wiring points on the wire receiving member relative to and independently of the wire supplies and said wiring guides remaining on the seats to form the wire through the preselected wiring points in a predetermined pattern, and to return said wiring guide to its respective seat when a wiring operation has been completed.

2. Apparatus for forming wires in sequence on a wire-receiving member as recited in claim 1, which further comprises:

means for anchoring portions of the wires extended beyond said wiring guides against movement to cause feeding of each wire through its respective wiring guide as said wiring guide is moved through the wiring points on the wire-receiving member in a wire forming operation.

3. Apparatus for forming wires in sequence on a wire-receiving member, as recited in claim 2, in which:

said wire anchoring means includes a row of anchoring members on the wire-receiving member adjacent said wiring guides.

4. Apparatus for forming wires in sequence on a wire-receiving member, as recited in claim 3, in which:

said means for moving said wire positioning device can move said attached preselected wiring guide to secure the wire extending through said wiring guide to one of said anchoring members prior to forming the wire on the wire-receiving member and prior to returning said wiring guide to its respective seat when a wiring operation has been completed.

5. Apparatus for forming wires in sequence on a wire-receiving member, as recited in claim 3, in which:

said wire anchoring means also includes anchoring members located off the wire-receiving member adjacent said wiring guides.

6. Apparatus for forming wires in sequence on a wire-receiving member, as recited in claim 1, in which:

said means for releasably attaching said wiring guides to said wire positioning device is a mechanical positive-type locking mechanism.

7. Apparatus for forming wires in sequence on a wire-receiving member, as recited in claim 1, which further comprises:

sets of cooperable ferromagnetic means and magnetic means on respective ones of said wiring guides and said seats for releasably retaining said wiring guides on said seats.

8. Apparatus for forming wires in sequence on a wire-receiving member, as recited in claim 7, in which:

said magnetic means are independent permanent magnets; and said means for releasably attaching said wiring guides to said wire positioning device comprises cooperable second ferromagnetic means and electromagnetic means, the magnetic attraction between said second ferromagnetic means and said electromagnetic means when said electromagnetic means is energized being greater than the magnetic attraction between each of said permanent magnets and said first ferromagnetic means.

9. Apparatus for forming wires in sequence on a wire-receiving member, as recited in claim 1, which further comprises:

means for positively advancing each wire through its respective wiring head during a wire laying operation.

10. Apparatus for forming wires in sequence on a wire-receiving member, as recited in claim 1, which further comprises:

a table for supporting the wire-receiving member; and means for mounting said wire supplies in fixed positions relative to said table and said wire positioning device.

11. A system for forming harness-type cable on a cable forming board having wire locating members projecting therefrom in an X-Y coordinate grid system, utilizing wires mounted on a plurality of respective wire supplies, which comprises:

a support table for the cable forming board;

a plurality of seats on said support table;

a plurality of wiring guides releasably mounted on respective ones of said seats and each capable of having at least one wire extended through and beyond said wiring guide, from a respective one of the wire supplies, said wiring guides being separately movable over the cable forming board relative to and independently of each other and the wire supplies;

first anchor means fixedly mounted on said support table for anchoring portions of the wires extended beyond said wiring guides against movement;

second anchor means fixedly mounted on the cable forming board for anchoring portions of the wires to the cable forming board;

a wire positioning device movable in X, Y and Z directions relative to the cable forming board and said wire anchoring means independently of the wire supplies and said wiring guides;

means for releasably attaching a preselected one of said wiring guides to said wire positioning device when said wire positioning device is moved adjacent said wiring guide for removal of said wiring guide from its respective seat; and means for moving said wire positioning device adjacent a preselected one of said wiring guides to attach said wire positioning device to said wiring guide by said releasable attaching means, for moving said wire positioning device and said attached wiring guide over the cable forming board relative to and independently of the wire supplies and said wiring guides remaining on the seats so as to pull the wire extending through said attached wiring guide from its respective wire supply and to form the wire between and about preselected ones of the wire locating members on the cable forming board in a predetermined pattern, for moving the wire positioning device and said attached wiring guide to secure the wire to said second wire anchoring means on the cable forming board, and to return said wiring guide to its respective seat after the wire has been secured to said second wire anchoring means at the completion of a wiring operation.

12. A system for forming harness-type cable as recited in claim 11, in which:
said means for releasably attaching each of said wiring guides to said wire positioning device includes a locking pin on said wire positioning device movable into an aperture in said wiring guide.

13. A system for forming harness-type cable as recited in claim 11, which further comprises:
sets of cooperable ferromagnetic means and magnetic means on respective ones of said seats and said wiring guides for releasably retaining said wiring guides on said seats.

14. A system for forming harness-type cable as recited in claim 13, in which:
said magnetic means are independent permanent magnets; and
said means for releasably attaching said wiring guides to said wire positioning device comprises second ferromagnetic means on each of said wiring guides and electromagnetic means on said wire positioning device, the magnetic attraction between each of said second ferromagnetic means and said electromagnetic means when said electromagnetic means is energized being greater than the magnetic attraction produced between each of said permanent magnets and said first ferromagnetic means.

15. In an apparatus for forming a cable harness on a cable board having an array of projecting pins, utilizing a plurality of wire supplies:
a frame having a plurality of seats;
a plurality of wiring heads resting in said seats, each of said wiring heads having a guide through which a wire can be projected from a respective one of said wire supplies, with said wiring heads being separately movable over the cable board relative to and independently of each other and said wire supplies;
means for anchoring leading end portions of the wires projecting from the guides;
a drive head movable relative to the cable board independently of said wiring heads and said wire supplies and having a device for selectively coupling one of said wiring heads to said drive head;
means for actuating said coupling device to couple said drive head to selected ones of said wiring heads; and
means for moving said drive head to move each coupled wiring head and guide over the cable board relative to and independently of said wire supplies and said wiring heads remaining on the seats along a path to lay each of the anchored wires between and about said projecting pins on the cable board and then moving each wiring head back to its respective seat, to form a cable harness.

16. In an apparatus as defined in claim 15, wherein:
each of said seats includes a pin for supporting the associated wiring head and magnetic means for retaining said wiring head on said support pin.

17. Apparatus for forming wires in sequence on a wire-receiving member having an array of wiring points defined thereon, utilizing wires mounted on a plurality of respective wire supplies, which comprises:
a plurality of wiring guides through each of which at least one wire can be fed from a respective one of the wire supplies as said wiring guide is moved through the wiring points on the wire-receiving member in a wire forming operation, each of said wiring guides being movable through the wiring points relative to and independently of its respective wire supply;
a wire positioning device movable relative to the wire-receiving member independently of the wire supplies and said wiring guides;
means for releasably attaching preselected ones of said wiring guides to said wire positioning device in sequence; and
means for moving said wire positioning device and each of said attached wiring guides through preselected ones of the wiring points on the wire-receiving member relative to and independently of the wire supplies to form the wire through the preselected wiring points in a predetermined pattern.

18. Apparatus for forming wires in sequence on a wire-receiving member, as recited in claim 17, in which:
each of said wiring guides is attachable to said wire positioning device by said releasable attaching means for movement with said wire positioning device as an integral unit;
said wiring guides project toward the wire-receiving member such that an end of each wiring guide can direct a wire emanating therefrom toward the wire-receiving member in the forming of the wire; and
said means for moving said wire positioning device and each attached wiring guide can move said wire positioning device and attached wiring guide as an integral unit toward the wire-receiving member to position the wire emanating end of said wiring guide closely adjacent the wire-receiving member during a wire forming operation.

19. In an apparatus for laying diverse runs of wires over a wiring frame having an array of wiring points defined thereon, utilizing a plurality of sources of wire;
a plurality of wiring heads having guides through each of which at least one wire can be fed from a respective one of the sources of wire as said guide is moved through the wiring points on the wiring frame in a wire laying operation, said wiring heads and guides being movable through the wiring points relative to and independently of the sources of wire;
a drive head movable relative to the wiring frame independently of the sources of wire and said wiring heads and having means for selectively coupling said drive head to one of said wiring heads; and
means for moving said drive head and each coupled wiring head through the wiring points on the wiring frame relative to and independently of the sources of wire to move said guide of said coupled wiring head closely adjacent the wiring frame to lay runs of the wire through the wiring points in a predetermined pattern.

20. In an apparatus as deined in claim 19:
means for positively feeding the wire being layed by the movement of the coupled drive and wiring heads.

21. In an apparatus as defined in claim 19:
means responsive to the tension in the layed wire exceeding a predetermined value for interrupting further movement of said drive head.

22. In an apparatus as defined in claim 19, wherein:
said coupling means includes an electromagnet for effecting a coupling between said drive head and a selected one of said wiring heads.

23. In a method of manipulating a bank of wiring heads to lay wires extending from respective wire supplies and emanating from the heads in an array of wiring points defined on a wire-receiving member, the steps of:

1. anchoring the ends of the wires emanating from the wiring heads against movement;
2. selecting one of the wiring heads and moving the head from an initial position in the bank of wiring heads through preselected ones of the wiring points on the wire-receiving member relative to and independently of other ones of the wiring heads and the wire supply for that wiring head, to lay a respective anchored wire through the preselected ones of the wiring points in a predetermined pattern;
3. returning the wiring head to its initial position after the laying of its respective wire has been completed;
4. repeating steps (2) and (3) with other ones of the wiring heads until a number of the wires have been laid out on the wire-receiving member in a predetermined pattern; and
5. severing the laid wires from their anchored ends.

24. A method of forming wires in any array of wiring points defined on a wire-receiving member, which comprises the steps of:

1. locating supplies of the wires in fixed positions with respect to a bank of wiring heads and the wire-receiving member;
2. passing a leading end portion of one of the wires from its respective supply through a respective one of the wiring heads so that the wire emanates from the wiring head;
3. anchoring the leading end portion of the wire against movement;
4. moving the wiring head for the anchored wire through preselected ones of the wiring points on the wirereceiving member relative to and independently of the wire supplies and the other wiring heads to lay the anchored wire through the preselected wiring points;
5. anchoring a portion of the laid wire to the wire-receiving member;
6. returning the wiring head to its initial position;
7. severing the laid wire between the wiring head and the latter anchored portion of the wire; and
8. repeating steps 2 through 7 with other ones of the wires until a number of the wires have been laid in the array of wiring points defined on the wire-receiving member.

25. A method as defined in claim 24, wherein:

the leading end portion of each wire initially is anchored at a position removed from the wire-receiving member and then anchored to the wire-receiving member prior to laying the wire on the wire-receiving member; and the wire subsequently is severed between the thus anchored portions thereof.

* * * * *